(12) United States Patent
Fernandez Orellana et al.

(10) Patent No.: US 11,494,239 B2
(45) Date of Patent: Nov. 8, 2022

(54) METHOD FOR ALLOCATING COMPUTING RESOURCES, ELECTRONIC DEVICE, AND COMPUTER PROGRAM PRODUCT

(71) Applicant: EMC IP Holding Company LLC, Hopkinton, MA (US)

(72) Inventors: Pedro Fernandez Orellana, Shanghai (CN); Zhen Jia, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 70 days.

(21) Appl. No.: 17/006,255

(22) Filed: Aug. 28, 2020

(65) Prior Publication Data

US 2022/0035669 A1 Feb. 3, 2022

(30) Foreign Application Priority Data

Jul. 31, 2020 (CN) .......................... 202010759315.X

(51) Int. Cl.
*G06F 9/46* (2006.01)
*G06F 9/50* (2006.01)

(52) U.S. Cl.
CPC .................... *G06F 9/505* (2013.01)

(58) Field of Classification Search
CPC ....................................................... G06F 9/505
See application file for complete search history.

(56) References Cited

U.S. PATENT DOCUMENTS

| 2007/0094665 | A1* | 4/2007 | Jackson | G06F 9/5072 |
| | | | | 718/104 |
| 2014/0189109 | A1* | 7/2014 | Jang | G06F 9/5077 |
| | | | | 709/224 |
| 2015/0334717 | A1* | 11/2015 | Rashid | H04W 16/14 |
| | | | | 370/329 |

(Continued)

OTHER PUBLICATIONS

Chang, Wei ; Hu, Yihong ; Shou, Guochu ; Liu, Yaqiong ; Guo, Zhigang; An offloading scheme leveraging on neighboring node resources for edge computing over fiber-wireless (FiWi) access networks; Nov. 2019, vol. 16 (11).*

(Continued)

*Primary Examiner* — Camquy Truong
(74) *Attorney, Agent, or Firm* — Ryan, Mason & Lewis, LLP

(57) ABSTRACT

Embodiments of the present disclosure relate to a method for allocating computing resources, an electronic device, and a corresponding computer program product. The method may include: obtaining an available resource list associated with a computing resource requester according to determination that a resource use request from the computing resource requester is received, wherein the available resource list includes the number and available time periods of computing resources that can be provided by at least one computing resource provider. In addition, the method further includes: allocating computing resources to the computing resource requester based on the available resource list and the resource use request, so that the computing resource requester uses the allocated computing resources to run a (Continued)

workload. The embodiments of the present disclosure can flexibly allocate the computing resources, thereby realizing full utilization of the computing resources.

20 Claims, 4 Drawing Sheets

(56) References Cited

U.S. PATENT DOCUMENTS

2017/0286187 A1* 10/2017 Chen ..................... G06F 9/5016
2018/0278685 A1*  9/2018 Tiwari ................ H04L 67/1095

OTHER PUBLICATIONS

Chieh-Hao Wang, Jing-Yan Lin; Resource Allocation and User Grouping for Sum Rate and Fairness Optimization in NOMA and IoT; 2018.*

Amazon Web Services, "AWS Outposts," https://aws.amazon.com/outposts/, Apr. 2020, 14 pages.

\* cited by examiner

METHOD FOR ALLOCATING COMPUTING RESOURCES, ELECTRONIC DEVICE, AND COMPUTER PROGRAM PRODUCT

RELATED APPLICATION(S)

The present application claims priority to Chinese Patent Application No. 202010759315.X, filed Jul. 31, 2020, and entitled "Method for Allocating Computing Resources, Electronic Device, and Computer Program Product," which is incorporated by reference herein in its entirety.

FIELD

The present disclosure generally relates to the field of computer networks, and in particular, to a method for allocating computing resources, an electronic device, and a computer program product.

BACKGROUND

Currently, server computing resources of a data center or a large enterprise are often not fully utilized. For example, computing resources owned by a data center can usually be divided into in-use computing resources and backup computing resources. The backup computing resources can usually be used successively as the company's business grows, or when the in-use computing resources are not available, the backup computing resources can replace unavailable parts of the in-use computing resources. The backup computing resources here are not fully utilized most of the time. For another example, the computing resources of the data center are used during working hours and are idle during other periods. The idle computing resources here are not fully utilized.

SUMMARY

Embodiments of the present disclosure provide a method and a device for allocating computing resources, and a corresponding computer program product.

In a first aspect of the present disclosure, there is provided a method for allocating computing resources. The method may include: obtaining an available resource list associated with a computing resource requester according to determination that a resource use request from the computing resource requester is received, wherein the available resource list includes the number and available time periods of computing resources that can be provided by at least one computing resource provider. In addition, the method further includes: allocating computing resources to the computing resource requester based on the available resource list and the resource use request, so that the computing resource requester uses the allocated computing resources to run a workload.

In a second aspect of the present disclosure, there is provided an electronic device. The device may include: at least one processing unit; and at least one memory, coupled to the at least one processing unit and having machine-executable instructions stored thereon, wherein when executed by the at least one processing unit, the instructions cause the device to perform actions, and the actions may include: obtaining an available resource list associated with a computing resource requester according to determination that a resource use request from the computing resource requester is received, wherein the available resource list includes the number and available time periods of computing resources that can be provided by at least one computing resource provider; and allocating computing resources to the computing resource requester based on the available resource list and the resource use request, so that the computing resource requester uses the allocated computing resources to run a workload.

In a third aspect of the present disclosure, there is provided a computer program product. The computer program product is tangibly stored in a non-transitory computer-readable medium and includes machine-executable instructions, wherein when executed, the machine-executable instructions cause a machine to perform steps of the method according to the first aspect.

This Summary is provided to introduce the selection of concepts in a simplified form, which will be further described in the Detailed Description below. The Summary is neither intended to identify key features or main features of the present disclosure, nor intended to limit the scope of the present disclosure.

BRIEF DESCRIPTION OF THE DRAWINGS

By description of example embodiments of the present disclosure in more detail with reference to the accompanying drawings, the above and other objectives, features, and advantages of the present disclosure will become more apparent. In the example embodiments of the present disclosure, the same reference numerals generally represent the same components.

DETAILED DESCRIPTION

Figure 1:
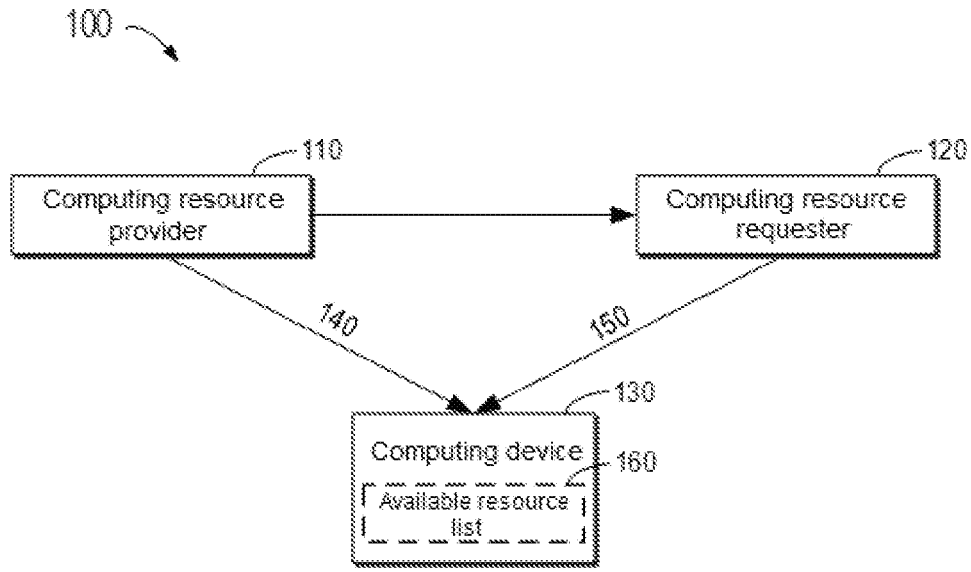
FIG. 1 shows a schematic diagram of an example environment in which a plurality of embodiments of the present disclosure can be implemented.

Illustrative embodiments of the present disclosure will be described in more detail below with reference to the accompanying drawings. Although the illustrative embodiments of the present disclosure are shown in the accompanying drawings, it should be understood that the present disclosure can be implemented in various forms and should not be limited by the embodiments set forth herein. Rather, these embodiments are provided to make the present disclosure more thorough and complete and to fully convey the scope of the present disclosure to those skilled in the art.

The term "include" and its variants as used herein indicate open-ended inclusion, i.e., "including, but not limited to." Unless specifically stated, the term "or" indicates "and/or." The term "based on" indicates "based at least in part on." The terms "an example embodiment" and "an embodiment" indicate "at least one example embodiment." The term "another embodiment" indicates "at least one additional embodiment." The terms "first," "second," etc. may refer to different or the same objects. Other explicit and implicit definitions may also be included below.

As mentioned above, a data center usually has backup computing resources that are not highly utilized. Such backup computing resources can usually only be used in extreme situations such as further needs of the company's business or when in-use computing resources are temporarily unavailable. In addition, computing resources of some companies only have a high utilization rate in certain periods, and are almost idle in other periods, causing waste. For example, most companies' computing resources are idle at night and on weekends, while gaming companies happen to require more computing resources during these periods. Therefore, how to make full use of these idle computing resources is a problem that needs to be solved urgently. In addition, with the development of new technologies such as 5G and the emergence of new applications in autonomous vehicles, cloud games, and other real-time scenarios that require low-latency geolocation resources, edge computing has become more and more important. The same application serving different geographic locations will require edge node computing resources near each specific location to ensure the quality of service. Currently, there is no complete technology for linking the above-mentioned backup computing resources at various geographic locations to business requirements of the edge node computing resources.

In order to at least partially solve the above and other potential problems and defects, an embodiment of the present disclosure provides an allocating solution of computing resources. In this solution, any company or data center with redundant computing resources can upload use details of computing resources it can provide to computing devices (for example, cloud computing devices). The use details may include the number, idle time, geographic locations, etc. of available computing resources. The use details are summarized by the computing devices. When other companies or data centers need additional computing resources, they can also upload a resource use request to the computing devices. The request may include the number and use time of computing resources requested to be used, geographic locations where corresponding applications run, etc. In this way, the present disclosure can flexibly allocate computing resources that are not fully utilized. Therefore, because the computing resources can be allocated with reference to the geographic locations, edge computing nodes may be used or leased more conveniently to deploy corresponding applications on them, thereby reducing time delay. The basic idea of the present disclosure is discussed first in conjunction with FIG. 1 below.

FIG. 1 shows a schematic diagram of example environment 100 in which a plurality of embodiments of the present disclosure can be implemented. As shown in FIG. 1, example environment 100 includes computing resource provider 110, computing resource requester 120, and computing device 130. When computing resource provider 110 is willing to provide or rent some of its computing resources, it can upload use details 140 of available computing resources to computing device 130. Since there may be multiple computing resource providers, the computing device 130 may summarize the use details of all the received computing resources and generate available resource list 160. Computing device 130 may also receive resource use request 150 from computing resource requester 120. The resource use request may include the number and use time of computing resources requested to be used, geographic locations where corresponding applications run, etc. Computing device 130 may traverse the available resource list to select corresponding computing resources that meet resource use request 150 for computing resource requester 120. For example, if it is found that the computing resources provided by computing resource provider 110 meet the requirements of resource use request 150, computing device 130 may establish a connection between computing resource provider 110 and computing resource requester 120, so that computing resource requester 120 may use the computing resources provided by computing resource provider 110.

In FIG. 1, computing resource provider 110 and computing resource requester 120 are not visible to each other. After computing device 130 determines the use or lease relationship between the two parties, computing resource provider 110 can only learn that the computing resources it provides are in a used state, and the computing resource requester can only learn that the allocated computing resources can be used. Therefore, it can be ensured that information of computing resource provider 110 and computing resource requester 120 is not excessively disclosed, and the network security of both parties can be guaranteed.

The technical solution described above is only used as an example, instead of limiting the present invention. In order to explain the principle of the above solution more clearly, the process of computing resource allocation will be described in more detail below with reference to FIG. 2.

Figure 2:
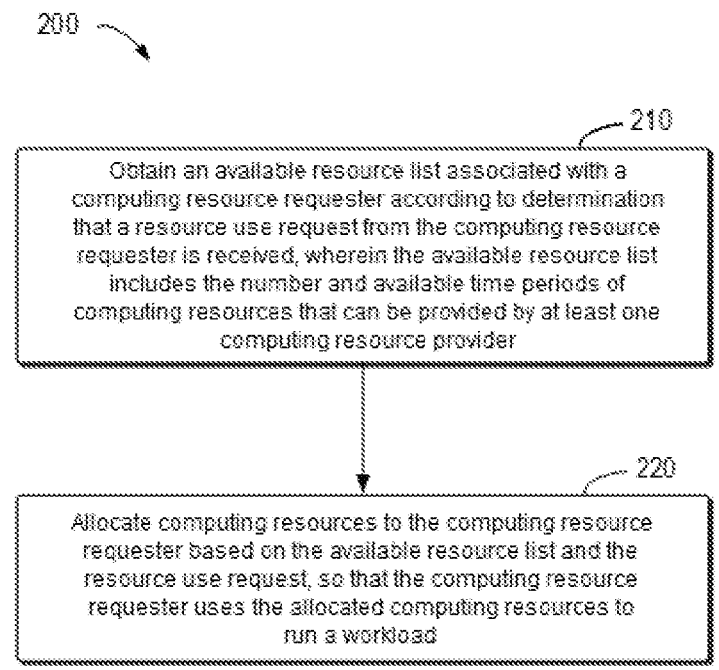
FIG. 2 shows a flowchart of a process for allocating computing resources according to an embodiment of the present disclosure.

FIG. 2 shows a flowchart of process or method 200 for allocating computing resources according to an embodiment of the present disclosure. For example, method 200 may be implemented in computing device 130 as shown in FIG. 1. Process or method 200 for allocating the computing resources according to an embodiment of the present disclosure shown in FIG. 2 is now described with reference to FIG. 1. For ease of understanding, the specific data mentioned in the following description are all examples and are not intended to limit the scope of protection of the present disclosure.

At 210, computing device 130 may, upon receiving a resource use request from computing resource requester 120, obtain available resource list 160 associated with computing resource requester 120, wherein available resource list 160 includes the number and available time periods of computing resources that can be provided by at least one computing resource provider 110. As an example, the available resource list may include the number and available time periods of computing resources that can be provided by multiple computing resource providers. These data about the computing resource providers may form a data table corresponding to the ID of the corresponding computing resource provider, so that computing device 130 may find a corresponding entry matching resource use request 150 sent by computing resource requester 120 from the list.

At 220, computing device 130 may allocate the computing resources to computing resource requester 120 based on available resource list 160 stored therein and resource use request 150 received from computing resource requester 120, so that the computing resource requester may use the allocated computing resources to run a workload. In some embodiments, computing device 130 may obtain the number and use time periods of the computing resources requested by computing resource requester 120 from resource use request 150. After that, computing device 130 may allocate the computing resources to computing resource requester 120 from computing resources provided by single computing resource provider 110 in the at least one computing resource provider in available resource list 160. In some embodiments, computing device 130 may coordinate computing resource provider 110 and computing resource requester 120 so that computing resource requester 120 can be authorized to use corresponding computing resources of computing resource provider 110. It should be understood that the number of the allocated computing resources is greater than or equal to the number of the requested computing resources, and the available time periods of the allocated computing resources encompass use time periods of the requested computing resources. In this way, computing device 130 may help the computing resource requester 120 find computing resource provider 110 that can support the use in terms of the number and the available time periods of the computing resources.

Figure 3:
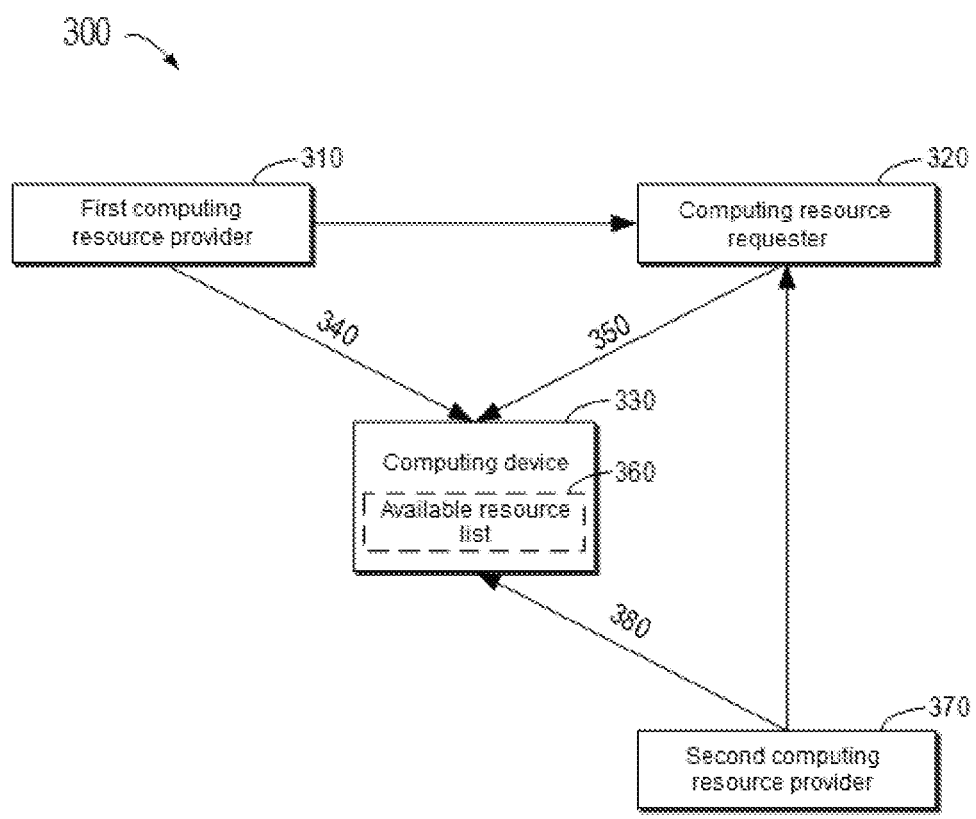
FIG. 3 shows a schematic diagram of another example environment in which a plurality of embodiments of the present disclosure can be implemented.

In another embodiment, there may be multiple computing resource providers, for example, two computing resource providers. The two computing resource providers jointly support computing resource requester 120 to use the computing resources. FIG. 3 shows a schematic diagram of another example environment 300 in which a plurality of embodiments of the present disclosure can be implemented. Different from FIG. 1, example environment 300 of FIG. 3 includes two computing resource providers, namely, first computing resource provider 310 and second computing resource provider 370. Computing device 330 may generate available resource list 360 based at least on use details 340 of available computing resources received from first computing resource provider 310 and use details 380 of available computing resources received from second computing resource provider 370. Also, when computing device 330 receives resource use request 350 from computing resource requester 320, computing device 330 may coordinate first computing resource provider 310 and second computing resource provider 370 to jointly support computing resource requester 320 based on use details 340, use details 380, and resource use request 350.

In FIG. 3, first computing resource provider 310, second computing resource provider 370, and computing resource requester 320 are all invisible to each other. After computing device 330 determines the use or lease relationship of the three parties, first computing resource provider 310 and second computing resource provider 370 can only learn that the computing resources they provide are in a used state, and computing resource requester 320 can only learn that the allocated computing resources can be used. Therefore, it can be ensured that the information of first computing resource provider 310 and computing resource requester 320 is not excessively disclosed, and network security of first computing resource provider 310, second computing resource provider 370 and computing resource requester 320 can be guaranteed.

As an example, computing device 330 may obtain the number and use time periods of the computing resources requested by computing resource requester 320 from resource use request 350. After that, computing device 330 may allocate a first number of computing resources and a second number of computing resources to computing resource requester 320 from computing resources provided by first computing resource provider 310 and second computing resource provider 370 in available resource list 360. It should be noted that the sum of the first number and the second number needs to be greater than or equal to the number of the requested computing resources, and each of a first available time period of the first number of computing resources and a second available time period of the second number of computing resources should encompass a use time period of the requested computing resources. In this way, the present disclosure can realize that the two computing resource providers simultaneously provide computing support for computing resource requester 320.

As another example, computing device 330 may obtain the number and use time periods of computing resources requested by computing resource requester 320 from resource use request 350. After that, computing device 330 may allocate a third number of computing resources and a fourth number of computing resources to computing resource requester 320 from computing resources provided by a third computing resource provider (not shown, which may be understood as "first computing resource provider 310") and a fourth computing resource provider (not shown, which may be understood as "second computing resource provider 370") in available resource list 360. It should be noted that each of the third number and the fourth number needs to be greater than or equal to the number of the requested computing resources, and a total time period covered by a third available time period of the third number of computing resources and a fourth available time period of the fourth number of computing resources should encompass a use time period of the requested computing resources. In this way, the present disclosure can realize that the two computing resource providers provide computing support to computing resource requester 320 respectively in different time periods.

Figure 4:
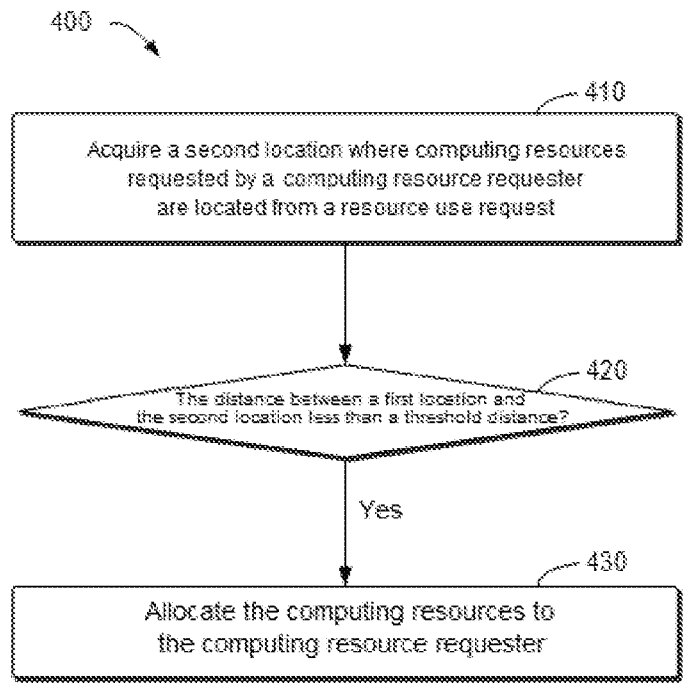
FIG. 4 shows a flowchart of another example process for allocating computing resources according to an embodiment of the present disclosure.

It should also be understood that, in order to further support new technologies such as edge computing, resource use request 350 may also include parameters such as geographic locations, that is, computing resource requester 320 may request the use of computing resources at or near a specific location. FIG. 4 shows a flowchart of another example process, also referred to as method 400, for allocating computing resources according to an embodiment of the present disclosure. As an example, method 400 may be implemented in computing device 330 shown in FIG. 3. Process or method 400 for allocating the computing resources according to an embodiment of the present disclosure shown in FIG. 4 is now described with reference to FIG. 3. For ease of understanding, the specific data mentioned in the following description are all examples and are not intended to limit the scope of protection of the present disclosure.

At 410, available resource list 360 in computing device 330 includes a first location where at least one computing resource provider (for example, first computing resource provider 310) is located, and computing device 330 may acquire a second location where computing resources requested by computing resource requester 320 are located from resource use request 350.

At 420, computing device 330 may compare the distance between the first location and the second location with a threshold distance. If the distance between the first location and the second location is less than the threshold distance, proceed to 430. At 430, computing device 330 may allocate the computing resources to computing resource requester 320. That is, when computing resource requester 320 requests computing resources near the second location, computing device 330 may help select the computing resource provider that is closest to the second location or located near the second location from available resource list 360 to achieve the allocation of the computing resources. In this way, the present disclosure can realize the use or lease of the computing resources near a specific location, thereby realizing edge computing to deploy corresponding applications thereon so as to reduce time delay.

Figure 5:
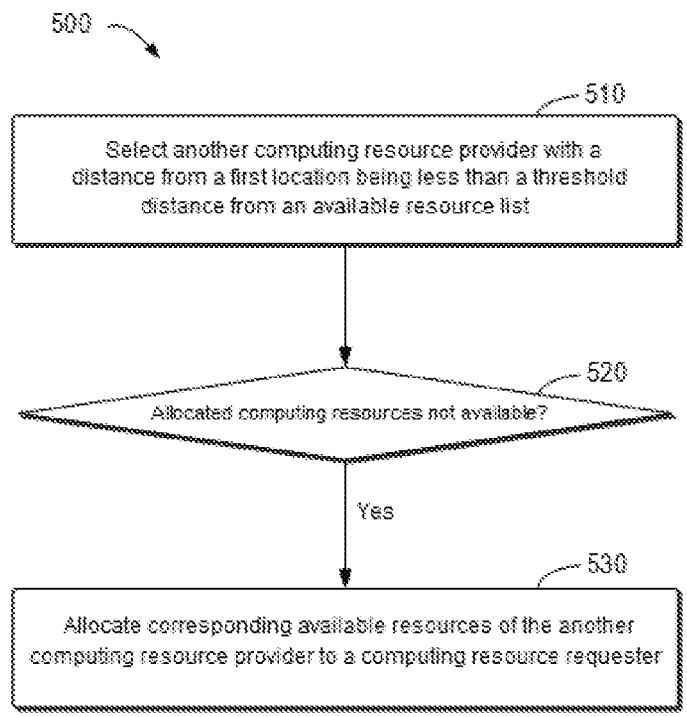
FIG. 5 shows a flowchart of yet another example process for allocating computing resources according to an embodiment of the present disclosure.

FIG. 5 shows a flowchart of yet another example process for allocating computing resources according to an embodiment of the present disclosure. As an example, method 500 may be implemented in computing device 330 shown in FIG. 3. Process or method 500 for allocating the computing resources according to an embodiment of the present disclosure shown in FIG. 5 is now described with reference to FIG. 3. For ease of understanding, the specific data mentioned in the following description are all examples and are not intended to limit the scope of protection of the present disclosure.

At 510, available resource list 360 in computing device 330 includes a first location where at least one computing resource provider (for example, first computing resource provider 310) is located, and computing device 330 may select another computing resource provider (for example, second computing resource provider 370) with the distance from the first location being less than the threshold distance, from available resource list 360.

At 520, computing device 330 may determine whether the allocated computing resources are not available, and if so, proceed to 530. At 530, computing device 330 may allocate corresponding available resources of another computing resource provider to computing resource requester 320. It should be understood that the "unavailability" of the computing resources here includes many situations. For example, a computing resource provider may unexpectedly lose power, resulting in unavailability of the computing resources. For another example, a computing resource provider may degrade services due to a shortage of computing resources, resulting in unavailability of the computing resources. If a similar situation occurs, another computing resource provider near the computing resource provider can provide alternative services. In this way, the reliability of the computing resource allocation mechanism of the present disclosure can be improved.

In some embodiments, in order to better provide reliable computing resources to the computing resource requester, computing device 330 or the corresponding computing resource provider may monitor the allocated computing resources to ensure that the allocated computing resources meet a predetermined service level agreement (SLA).

According to the resource use request provided by computing resource requester 320, the present disclosure may determine limiting conditions such as the number and the use time of computing resources requested to be used, and the geographic location where corresponding applications run, thereby providing the computing resources meeting requirements to computing resource requester 320. In this way, the present disclosure can determine multiple data centers or companies willing to make full use of computing resources as members of the agreement, thereby realizing orderly use and leasing of computing resources in a system with confidentiality, supervision, and security mechanisms, so as to realize the flexible allocation of computing resources that are not fully utilized. In addition, since any data center that is a member of the agreement can use or lease edge computing nodes to deploy corresponding applications thereon, time delay can be shortened and user experience can be improved.

Figure 6:
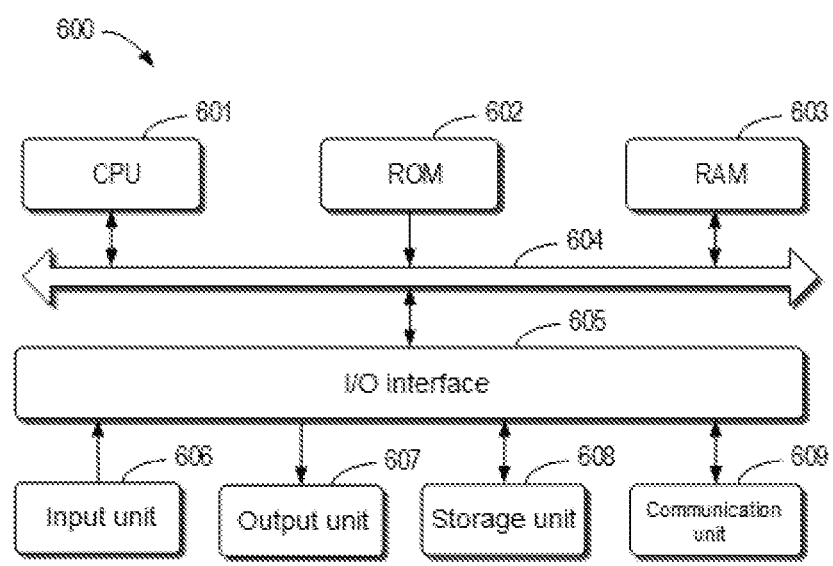
FIG. 6 shows a block diagram of a computing device that can be configured to implement a plurality of embodiments of the present disclosure.

FIG. 6 shows a schematic block diagram of example device 600 that can be configured to implement an embodiment of the content of the present disclosure. As shown in the figure, device 600 includes central processing unit (CPU) 601 that can perform various appropriate actions and processing according to computer program instructions stored in read-only memory (ROM) 602 or computer program instructions loaded from storage unit 608 into random access memory (RAM) 603. In RAM 603, various programs and data required for the operation of device 600 can also be stored. CPU 601, ROM 602, and RAM 603 are connected to each other through bus 604. Input/Output (I/O) interface 605 is also connected to bus 604.

Multiple components in device 600 are connected to I/O interface 605, including: input unit 606, such as a keyboard and a mouse; output unit 607, such as various types of displays and speakers; storage unit 608, such as a magnetic disk and an optical disk; and communication unit 609, such as a network card, a modem, and a wireless communication transceiver. Communication unit 609 allows device 600 to exchange information/data with other devices over a computer network such as the Internet and/or various telecommunication networks.

The various processes and processing described above, for example, method 200, 400, and/or 500, may be performed by CPU 601. For example, in some embodiments, method 200, 400, and/or 500 may be implemented as a computer software program that is tangibly included in a machine-readable medium such as storage unit 608. In some embodiments, part or all of the computer program may be loaded and/or installed onto device 600 via ROM 602 and/or communication unit 609. When the computer program is loaded to RAM 603 and executed by CPU 601, one or more actions of method 200, 400, and/or 500 described above may be executed. Illustrative embodiments of the present disclosure include a method, an apparatus, a system, and/or a computer program product. The computer program product may include a computer-readable storage medium on which computer-readable program instructions for performing various aspects of the present disclosure are loaded.

The computer-readable storage medium may be a tangible device that can hold and store instructions used by an instruction-executing device. For example, the computer-readable storage medium may be, but is not limited to, an electric storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, RAM, ROM, an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device such as a punch card or a protruding structure in a groove with instructions stored thereon, and any suitable combination of the foregoing. The computer-readable storage medium used here is not construed as transient signals themselves, such as radio waves or other freely propagating electromagnetic waves, electromagnetic waves propagating through waveguides or other transmission media (for example, optical pulses through fiber-optic cables), or electrical signals transmitted through electrical wires.

The computer-readable program instructions described herein can be downloaded from a computer-readable storage medium to various computing/processing devices, or downloaded to an external computer or external storage device via a network such as the Internet, a local area network, a wide area network, and/or a wireless network. The network may include copper transmission cables, optical fiber transmission, wireless transmission, routers, firewalls, switches, gateway computers, and/or edge servers. A network adapter card or network interface in each computing/processing device receives computer-readable program instructions from the network and forwards the computer-readable program instructions for storage in the computer-readable storage medium in each computing/processing device.

The computer program instructions for performing the operations of the present disclosure may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk and C++ and conventional procedural programming languages such as "C" language or similar programming languages. The computer-readable program instructions may be executed entirely on a user computer, partly on a user computer, as a standalone software package, partly on a user computer and partly on a remote computer, or entirely on a remote computer or a server. In the case where a remote computer is involved, the remote computer can be connected to a user computer over any kind of networks, including a local area network (LAN) or a wide area network (WAN), or can be connected to an external computer (e.g., connected over the Internet using an Internet service provider). In some embodiments, an electronic circuit, such as a programmable logic circuit, a field programmable gate array (FPGA), or a programmable logic array (PLA), is customized by utilizing state information of the computer-readable program instructions. The electronic circuit may execute the computer-readable program instructions so as to implement various aspects of the present disclosure.

Various aspects of the present disclosure are described here with reference to flowcharts and/or block diagrams of the methods, the apparatuses (systems), and the computer program products according to the embodiments of the present disclosure. It should be understood that each block in the flowcharts and/or block diagrams as well as a combination of blocks in the flowcharts and/or block diagrams may be implemented by using the computer-readable program instructions.

The computer-readable program instructions may be provided to a processing unit of a general purpose computer, a special purpose computer, or other programmable data processing apparatuses to produce a machine, such that the instructions, when executed by the processing unit of the computer or other programmable data processing apparatuses, generate an apparatus for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implemented process, so that the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functionalities, and operations of possible implementations of the system, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions marked in the blocks may also occur in an order different from that marked in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

The embodiments of the present disclosure have been described above. The above description is illustrative, rather than exhaustive, and is not limited to the disclosed embodiments. Numerous modifications and alterations are apparent to those of ordinary skill in the art without departing from the scope and spirit of the illustrated various embodiments. The selection of terms as used herein is intended to best explain the principles and practical applications of the various embodiments or technical improvements to technologies on the market, and to otherwise enable persons of ordinary skill in the art to understand the embodiments disclosed herein.

What is claimed is:

1. A method for allocating computing resources, comprising:

obtaining an available resource list associated with a computing resource requester according to determination that a resource use request from the computing resource requester is received, wherein the available resource list comprises the number and available time periods of computing resources that can be provided by at least one computing resource provider; and allocating computing resources to the computing resource requester based on the available resource list and the resource use request, so that the computing resource requester uses the allocated computing resources to run a workload;

wherein the at least one computing resource provider comprises a first computing resource provider and a second computing resource provider, and allocating the computing resources to the computing resource requester comprises:

obtaining the number and use time periods of computing resources requested by the computing resource requester from the resource use request; and allocating a first number of computing resources and a second number of computing resources to the computing resource requester from computing resources provided by the first computing resource provider and the second computing resource provider in the available resource list, wherein the sum of the first number and the second number is greater than or equal to the number of the requested computing resources, and each of a first available time period of the first number of computing resources and a second available time period of the second number of computing resources encompasses a use time period of the requested computing resources.

2. A method for allocating computing resources, comprising:
obtaining an available resource list associated with a computing resource requester according to determination that a resource use request from the computing resource requester is received, wherein the available resource list comprises the number and available time periods of computing resources that can be provided by at least one computing resource provider; and
allocating computing resources to the computing resource requester based on the available resource list and the resource use request, so that the computing resource requester uses the allocated computing resources to run a workload;
wherein the at least one computing resource provider comprises a first computing resource provider and a second computing resource provider, and allocating the computing resources to the computing resource requester comprises:
obtaining the number and use time periods of computing resources requested by the computing resource requester from the resource use request; and
allocating a first number of computing resources and a second number of computing resources to the computing resource requester from computing resources provided by the first computing resource provider and the second computing resource provider in the available resource list, wherein each of the first number and the second number is greater than or equal to the number of the requested computing resources, and a total time period covered by a first available time period of the first number of computing resources and a second available time period of the second number of computing resources encompasses a use time period of the requested computing resources.

3. The method according to claim 1,
wherein the available resource list comprises a first location where the at least one computing resource provider is located, and the method further comprises:
selecting another computing resource provider with a distance from the first location being less than a threshold distance from the available resource list; and
according to determination that the allocated computing resources are not available, allocating corresponding available resources of said another computing resource provider to the computing resource requester.

4. The method according to claim 1, further comprising:
monitoring the allocated computing resources to ensure that the allocated computing resources comply with a predetermined service level agreement (SLA).

5. An electronic device, comprising:
at least one processing unit; and
at least one memory, coupled to the at least one processing unit and having machine-executable instructions stored thereon, wherein when executed by the at least one processing unit, the instructions cause the device to perform actions, and the actions comprise:
obtaining an available resource list associated with a computing resource requester according to determination that a resource use request from the computing resource requester is received, wherein the available resource list comprises the number and available time periods of computing resources that can be provided by at least one computing resource provider; and
allocating computing resources to the computing resource requester based on the available resource list and the resource use request, so that the computing resource requester uses the allocated computing resources to run a workload;
wherein the at least one computing resource provider comprises a first computing resource provider and a second computing resource provider, and allocating the computing resources to the computing resource requester comprises:
obtaining the number and use time periods of computing resources requested by the computing resource requester from the resource use request; and
allocating a first number of computing resources and a second number of computing resources to the computing resource requester from computing resources provided by the first computing resource provider and the second computing resource provider in the available resource list, wherein the sum of the first number and the second number is greater than or equal to the number of the requested computing resources, and each of a first available time period of the first number of computing resources and a second available time period of the second number of computing resources encompasses a use time period of the requested computing resources.

6. An electronic device, comprising:
at least one processing unit and
at least one memory, coupled to the at least one processing unit and having machine-executable instructions stored thereon, wherein when executed by the at least one processing unit, the instructions cause the device to perform actions, and the actions comprise:
obtaining an available resource list associated with a computing resource requester according to determination that a resource use request from the computing resource requester is received, wherein the available resource list comprises the number and available time periods of computing resources that can be provided by at least one computing resource provider; and
allocating computing resources to the computing resource requester based on the available resource list and the resource use request, so that the computing resource requester uses the allocated computing resources to run a workload;
wherein the at least one computing resource provider comprises a first computing resource provider and a second computing resource provider, and allocating the computing resources to the computing resource requester comprises:
obtaining the number and use time periods of computing resources requested by the computing resource requester from the resource use request; and
allocating a first number of computing resources and a second number of computing resources to the computing resource requester from computing resources provided by the first computing resource provider and the second computing resource provider in the available resource list, wherein each of the first number and the second number is greater than or equal to the number of the requested computing resources, and a total time period covered by a first available time period of the first number of computing resources and a second available time period of the second number of computing resources encompasses a use time period of the requested computing resources.

7. The device according to claim 5, wherein the available resource list comprises a first location where the at least one computing resource provider is located, and the actions further comprise:
selecting another computing resource provider with a distance from the first location being less than a threshold distance from the available resource list; and
according to determination that the allocated computing resources are not available, allocating corresponding available resources of said another computing resource provider to the computing resource requester.

8. The device according to claim 5, wherein the actions further comprise:
monitoring the allocated computing resources to ensure that the allocated computing resources comply with a predetermined service level agreement (SLA).

9. A computer program product tangibly stored in a non-transitory computer-readable medium and comprising machine-executable instructions, wherein when executed, the machine-executable instructions cause a machine to perform steps of a method for allocating computing resources, the method comprising:
obtaining an available resource list associated with a computing resource requester according to determination that a resource use request from the computing resource requester is received, wherein the available resource list comprises the number and available time periods of computing resources that can be provided by at least one computing resource provider; and
allocating computing resources to the computing resource requester based on the available resource list and the resource use request, so that the computing resource requester uses the allocated computing resources to run a workload;
wherein the at least one computing resource provider comprises a first computing resource provider and a second computing resource provider, and allocating the computing resources to the computing resource requester comprises:
obtaining the number and use time periods of computing resources requested by the computing resource requester from the resource use request; and
allocating a first number of computing resources and a second number of computing resources to the computing resource requester from computing resources provided by the first computing resource provider and the second computing resource provider in the available resource list, wherein the sum of the first number and the second number is greater than or equal to the number of the requested computing resources, and each of a first available time period of the first number of computing resources and a second available time period of the second number of computing resources encompasses a use time period of the requested computing resources.

10. A computer program product tangibly stored in a non-transitory computer-readable medium and comprising machine-executable instructions, wherein when executed, the machine-executable instructions cause a machine to perform steps of a method for allocating computing resources, the method comprising:
obtaining an available resource list associated with a computing resource requester according to determination that a resource use request from the computing resource requester is received, wherein the available resource list comprises the number and available time periods of computing resources that can be provided by at least one computing resource provider; and
allocating computing resources to the computing resource requester based on the available resource list and the resource use request, so that the computing resource requester uses the allocated computing resources to run a workload;
wherein the at least one computing resource provider comprises a first computing resource provider and a second computing resource provider, and allocating the computing resources to the computing resource requester comprises:
obtaining the number and use time periods of computing resources requested by the computing resource requester from the resource use request; and
allocating a first number of computing resources and a second number of computing resources to the computing resource requester from computing resources provided by the first computing resource provider and the second computing resource provider in the available resource list, wherein each of the first number and the second number is greater than or equal to the number of the requested computing resources, and a total time period covered by a first available time period of the first number of computing resources and a second available time period of the second number of computing resources encompasses a use time period of the requested computing resources.

11. The computer program product according to claim 9, wherein the available resource list comprises a first location where the at least one computing resource provider is located, and the method further comprises:
selecting another computing resource provider with a distance from the first location being less than a threshold distance from the available resource list; and
according to determination that the allocated computing resources are not available,
allocating corresponding available resources of said another computing resource provider to the computing resource requester.

12. The computer program product according to claim 9, wherein the method further comprises:
monitoring the allocated computing resources to ensure that the allocated computing resources comply with a predetermined service level agreement (SLA).

13. The computer program product according to claim 9, wherein the allocated computing resources comprise edge computing resources of one or more edge nodes.

14. The method according to claim 1, wherein the allocated computing resources comprise edge computing resources of one or more edge nodes.

15. The method according to claim 1, wherein the available resource list comprises a first location where the at least one computing resource provider is located, and allocating the computing resources to the computing resource requester comprises:
acquiring a second location where computing resources requested by the computing resource requester are located from the resource use request; and
allocating the computing resources to the computing resource requester according to determination that a distance between the first location and the second location is less than a threshold distance.

16. The device according to claim 5, wherein the available resource list comprises a first location where the at least one computing resource provider is located, and allocating the computing resources to the computing resource requester comprises:

acquiring a second location where computing resources requested by the computing resource requester are located from the resource use request; and allocating the computing resources to the computing resource requester according to determination that a distance between the first location and the second location is less than a threshold distance.

17. The computer program product according to claim 9, wherein the available resource list comprises a first location where the at least one computing resource provider is located, and allocating the computing resources to the computing resource requester comprises:

acquiring a second location where computing resources requested by the computing resource requester are located from the resource use request; and allocating the computing resources to the computing resource requester according to determination that a distance between the first location and the second location is less than a threshold distance.

18. The method according to claim 2, wherein the available resource list comprises a first location where the at least one computing resource provider is located, and the method further comprises:

selecting another computing resource provider with a distance from the first location being less than a threshold distance from the available resource list; and according to determination that the allocated computing resources are not available, allocating corresponding available resources of said another computing resource provider to the computing resource requester.

19. The device according to claim 6, wherein the available resource list comprises a first location where the at least one computing resource provider is located, and the actions further comprise:

selecting another computing resource provider with a distance from the first location being less than a threshold distance from the available resource list; and according to determination that the allocated computing resources are not available, allocating corresponding available resources of said another computing resource provider to the computing resource requester.

20. The computer program product according to claim 10, wherein-the available resource list comprises a first location where the at least one computing resource provider is located, and the method further comprises:

selecting another computing resource provider with a distance from the first location being less than a threshold distance from the available resource list; and according to determination that the allocated computing resources are not available, allocating corresponding available resources of said another computing resource provider to the computing resource requester.

\* \* \* \* \*